BEDS,
239
T. Howe,
Bed Bottom,
Reissue No. 884.
of 11054 of June 13, 1854
Reissued Jan. 17, 1860.
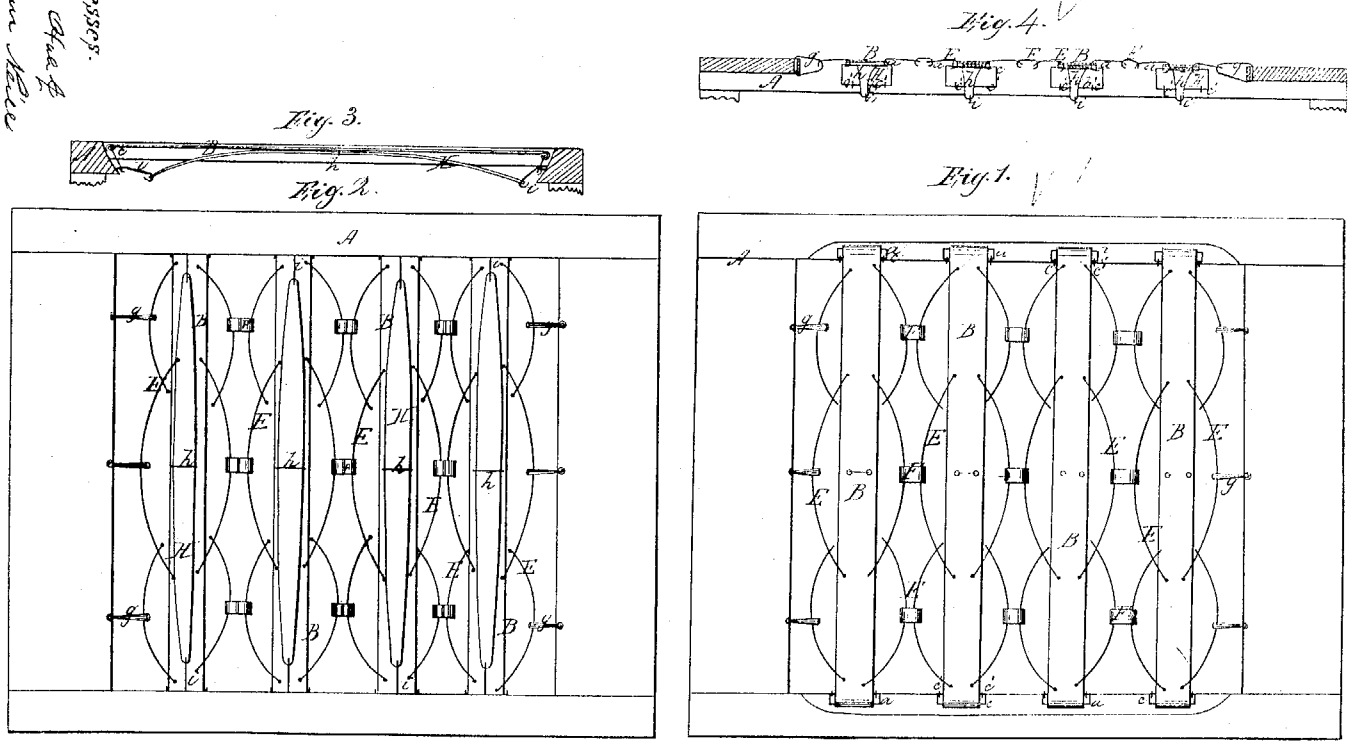
Witnesses.
S. T. Hall
Arthur Neice
Inventor.
Tyler Howe
N. PETERS, PHOTO-LITHOGRAPHER, WASHINGTON, D. C.

UNITED STATES PATENT OFFICE.

TYLER HOWE, OF CAMBRIDGEPORT, MASSACHUSETTS.

IMPROVEMENT IN BED-BOTTOMS.

Specification forming part of Letters Patent No. 11,054, dated June 13, 1854; Reissue No. 881, dated January 17, 1860.

*To all whom it may concern:*

Be it known that I, TYLER HOWE, of Cambridgeport, in the county of Middlesex and State of Massachusetts, have invented a new and useful Improvement in the Spring Foundation for Mattresses, or what are termed spring-beds; and I do hereby declare the same to be fully described and represented in the following specification, and the accompanying drawings, of which—

Figure 1 represents a top view of my method of constructing a bed or mattress foundation. Fig. 2 is an under side view of the same. Fig. 3 is a tranverse section of it.

In the first place I make use of a frame, A, which may be the bedstead, or a frame to rest upon a bedstead, within which I arrange and apply springs in the following manner: I take plates or bearers of steel, B B, or any other suitable material having a proper elasticity, and being about two and a half inches in width. These bearers I extend across the frame parallel to one another, and connect each of them to the frame by means of rocker-links *c*, there being such a rocker link at or near each end of the bearers B B.

In Fig. 4 I have exhibited a longitudinal section of my spring-bed foundation, and have therein more clearly shown the rocker-links. Each of these rocker-links may be made of wire bent in a form as shown in the drawings, and should be so made as to accommodate the width of the bearers to which they are attached and to allow free operation of the bearers upon them. These rocker-links are connected at their upper sides to the bearers B B so as to operate somewhat in the manner of a hinge, and at their lower sides are hinged or connected to the frame A by two staples, *c′ c′*. These rocker-links serve to support the bearers B B and allow them to freely spring upward and downward. By the peculiar construction of these rocker-links, and the manner in which they are attached to the frame and bearers, they are allowed to swing back and forth, so that when the bearers are sprung down the rocker-links turn inward of the frame.

To prevent injurious strain upon the bearers in case they should happen to be too flexible, a semi-elliptical or bowed spring, H, may be arranged on the under side of each bearer B B and made to extend nearly across the frame, and be connected at its ends to the frame or the rocker-links by means of hooks *i*, and also to the bearers by means of a staple, *h*, the spring H being allowed to play freely in said staple. A series of wires, as seen at E E, two to each bearer, may be used if desired to connect the bearers together, and said wires may be connected to said bearers by hooks at their ends, and one set of wires of any one of the bearers may be connected to that of the next adjacent bearer by means of clasps or pieces of metal F F F and be arranged and applied as seen in the drawings. The external set of each two outer bearers may be connected to the frame by means of lacing or cords, as seen at *g g*.

From the above it will be seen that each bearer B may be sprung freely downward without interruption from the adjacent bearers, the rocker-levers of the bearer, when borne upon, turning inward to allow the free springing of the bearer to take place.

By constructing a bed-bottom in the manner above stated the whole foundation can freely accommodate itself to the body of a person while lying upon it and without one bearer affecting the action of the other.

What I claim as my invention is—

1. The spring-bearers B and rocker-links, *c*, in combination with the bed-frame, essentially as described.

2. Combining the spring-bearers B B together and with the frame in lateral directions by means of wire and clasps, in combination with connecting said bearers at their ends to such frame by means of rocker-links, all substantially as hereinbefore specified and for the purpose of forming a mattress foundation of bar-springs whose parts shall readily accommodate themselves to the varied strains induced by a person's body when lying upon them, and this without injurious strain upon one another.

TYLER HOWE.

Witnesses:
R. H. EDDY,
F. P. HALE, JR.